(12) United States Patent
Byers et al.

(10) Patent No.: US 9,754,022 B2
(45) Date of Patent: Sep. 5, 2017

(54) SYSTEM AND METHOD FOR LANGUAGE SENSITIVE CONTEXTUAL SEARCHING

(75) Inventors: Simon Byers, Summit, NJ (US); David Kormann, Morristown, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 174 days.

(21) Appl. No.: 11/929,645

(22) Filed: Oct. 30, 2007

(65) Prior Publication Data
US 2009/0112845 A1 Apr. 30, 2009

(51) Int. Cl.
*G06F 17/30* (2006.01)
*G06F 7/00* (2006.01)

(52) U.S. Cl.
CPC .................. *G06F 17/30696* (2013.01)

(58) Field of Classification Search
USPC ........................................................ 707/5, 760
See application file for complete search history.

(56) References Cited

U.S. PATENT DOCUMENTS

| | | | |
|---|---|---|---|
| 5,933,822 A * | 8/1999 | Braden-Harder et al. ........ 707/5 |
| 6,006,221 A * | 12/1999 | Liddy ............... G06F 17/30011 |
| 6,081,774 A * | 6/2000 | de Hita et al. .................... 704/9 |
| 6,463,404 B1 * | 10/2002 | Appleby ............................ 704/9 |
| 6,604,101 B1 * | 8/2003 | Chan et al. .................... 707/706 |
| 6,901,399 B1 * | 5/2005 | Corston et al. .................. 707/6 |
| 6,999,932 B1 * | 2/2006 | Zhou ............................. 704/277 |
| 7,058,626 B1 * | 6/2006 | Pan et al. |
| 7,111,237 B2 * | 9/2006 | Chan .............................. 715/265 |
| 7,194,455 B2 * | 3/2007 | Zhou et al. |
| 7,562,082 B2 * | 7/2009 | Zhou |
| 7,747,611 B1 * | 6/2010 | Milic-Frayling et al. ..... 707/722 |
| 2003/0018468 A1 * | 1/2003 | Johnson et al. ................... 704/8 |
| 2003/0220197 A1 * | 11/2003 | Kitagawa et al. ............. 504/239 |
| 2003/0220917 A1 * | 11/2003 | Copperman et al. ............. 707/3 |
| 2004/0102201 A1 * | 5/2004 | Levin ................... G06F 17/2735 455/466 |
| 2004/0117352 A1 * | 6/2004 | Schabes et al. ................... 707/3 |
| 2004/0194099 A1 * | 9/2004 | Lamping et al. ............. 718/100 |
| 2005/0177358 A1 * | 8/2005 | Melomed et al. ................ 704/2 |
| 2006/0074628 A1 * | 4/2006 | Elbaz et al. ...................... 704/8 |
| 2006/0129915 A1 * | 6/2006 | Chan .............................. 715/512 |
| 2006/0161543 A1 * | 7/2006 | Feng et al. ........................ 707/5 |
| 2006/0173886 A1 * | 8/2006 | Moulinier et al. ............ 707/101 |
| 2008/0221867 A1 * | 9/2008 | Schreiber ........................ 704/8 |

(Continued)

FOREIGN PATENT DOCUMENTS

DE WO 2005057425 A2 * 6/2005 ......... G06F 17/2818

OTHER PUBLICATIONS

Ntoulas et al, "The infocious web search engine: Improving web searching through linguistic analysis" May 2005.*

(Continued)

*Primary Examiner* — Kuen Lu

(57) ABSTRACT

A method, system and computer-readable media for searching a database and returning relevant results are disclosed. The method includes the steps of receiving a user query in one language, searching a database based on the user query to obtain one or more results, processing the results according to a local linguistic context association with the user query, and presenting to the user the results with an identifier for each result in which a local linguistic context around a location of the user query is in a second language.

21 Claims, 3 Drawing Sheets

(56) References Cited

U.S. PATENT DOCUMENTS

2008/0249992 A1* 10/2008 Goedecke et al. ............... 707/3
2008/0281804 A1    11/2008 Zhao et al.
2009/0070301 A1*  3/2009 McLean et al. ................. 707/3
2010/0287049 A1* 11/2010 Rousso ............. G06Q 30/0255
                                                     705/14.53

OTHER PUBLICATIONS

"Language in india", 2005, Dash, Ph.D.*
Sam H. Minelli et al., "Gathering Requirements for Multilingual Search of Audiovisual Material in Cultural Heritage," Proceedings of Workshop on User Centricity-state of the art (16th IST Mobile and Wireless Communications Summit). Budapest, Hungary, Jul. 2007.

* cited by examiner

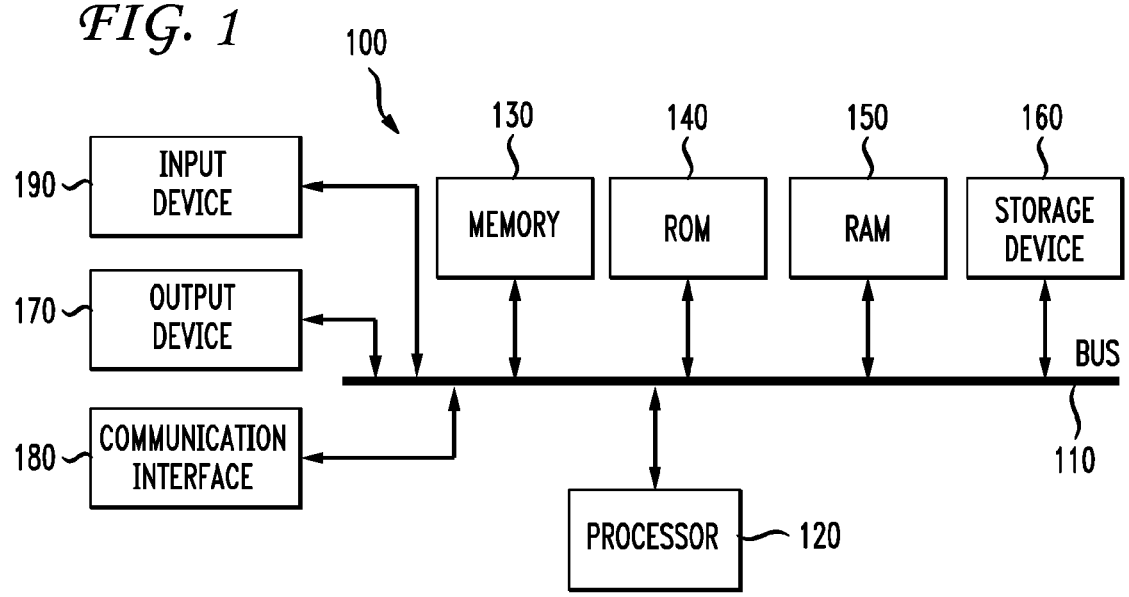
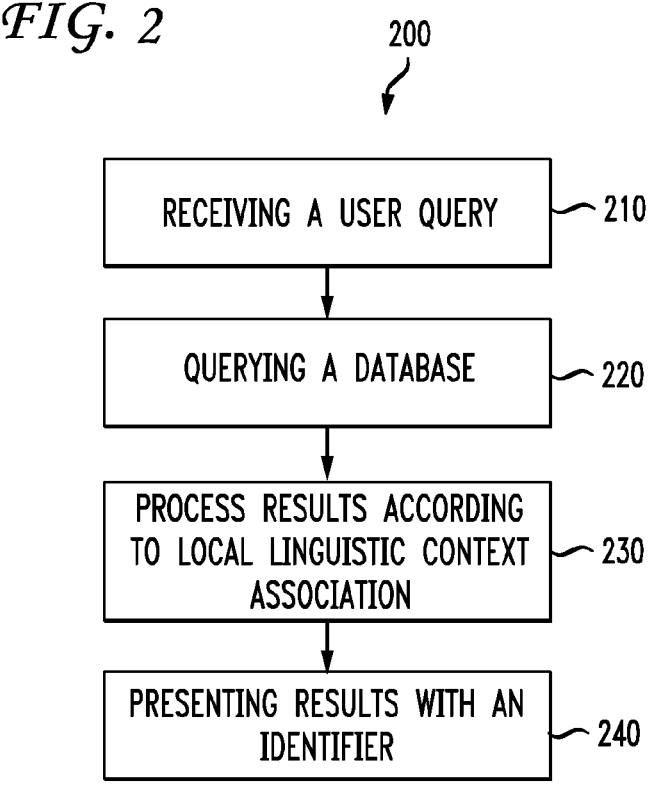

`l'amour`  [SEARCH AGAIN] — 410

Sort movie results by: ⦿ Year ○ Hits ○ Title
○ Language of source document — 460

Your search for l'amour took 0.002 sec to return 68 results from — 420
33 movies, showing 1-20 in increasing time order:

The Women (1939)  440
8 results

Married, divorced, married, divorced, // l'amour, l'amour.
L'amour, l'amour. // How it can let you down!
L'amour, l'amour.
L'amour, l'amour.
L'amour, l'amour. Toujours l'amour!
Who the heck is paging l'Amour?
L'amour, l'amour.
L'amour, l'amour.

430

Going My Way (1944) — 450
12 results

L'amour est // un oiseau rebelle
- L'amour est un oiseau rebelle // - L'amour
- Que nul ne peut apprivoiser // - L'amour
- Et c'est bien en vain // qu'on l'appelle // - L'amour
- S'il lui convient refuser // - L'amour
L'amour est enfant de Boheme
L'amour est loin // tu peut l'attendre
- Tout autour de toi vite, vite // - L'amour

Guess Who's Coming to Dinner (1967)
2 results
450

C'est la beaut'e de l'amour
Oh, pour l'amour de Dieu !

Women in Love (1969)

L'amour, l'amore, die Liebe.
// I detest it in every language.

Raising Arizona (1987)

I'm talkin' about l'amour. // I'm talkin' that me
and Dot are swingers.

RoboCop (1987)

la vie continue, C'est pas nouveau, // la lutte pour
l'amour et la gloire,
450

SYSTEM AND METHOD FOR LANGUAGE SENSITIVE CONTEXTUAL SEARCHING

BACKGROUND OF THE INVENTION

1. Field of the Invention

This invention relates to the field of database searching, and more particularly to the field of language-based database searching using language-sensitive contextual searching.

2. Introduction

Information retrieval (IR) is the science of searching for information in documents, searching for documents themselves, searching for metadata which describe documents, or searching within databases, whether relational stand-alone databases or hypertextually-networked databases such as the World Wide Web. Automated IR systems are used to reduce information overload. Many universities and public libraries use IR systems to provide access to books, journals, and other documents. Web search engines such as Google, Yahoo search or Live Search (formerly MSN Search) are the most visible IR applications.

An information retrieval process begins by a user entering a query in to the system. Queries are formal statements of information needs, for example search strings in web search engines. In information retrieval a query does not uniquely identify a single object in the collection. Instead, several objects may match the query, perhaps with different degrees of relevancy.

An object is an entity which keeps or stores information in a database. User queries are matched to objects stored in the database. Depending on the application the data objects may be, for example, text documents, images or videos. Often the documents themselves are not kept or stored directly in the IR system, but are instead represented in the system by document surrogates.

Most IR systems compute a numeric score on how well each object in the database match the query, and rank the objects according to this value. The top ranking objects are then shown to the user. The process may then be iterated if the user wishes to refine the query.

As globalization increases, many sources are not only being produced in numerous languages, but some sources may even contain numerous languages within them. Determining which language or languages are used in a source can be a daunting task. As such, several methods of determining a source's language have been derived. Methods range from identifying specific short words in the sources, to comparing strings of letters with a reference, to identifying symbols only used in certain languages. Using one or several of these techniques, computers have a high success rate in determining the language or languages of a document.

While present search engines may be able to search for words in other languages, there is a need for an improved information retrieval system that is able to search for terms in one language and determine if a context or a document containing the result is in a second language.

SUMMARY

Additional features and advantages of the invention will be set forth in the description which follows, and in part will be obvious from the description, or may be learned by practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth herein.

One embodiment of the present invention includes a method of searching a database and returning relevant results. The method includes the steps of receiving a user query in a first language, querying a database based on the user query to obtain at least one result, processing the results according to a local linguistic context association with the user query, and presenting to the user the results including an identifier for each result in which a local linguistic context around a location of the user query is in a second language.

In another embodiment, if the local language and the second language are the same language, then the system presents the results further by prioritizing the results based on which of the results have the local linguistic context of the local language.

Another embodiment further includes determining if the user query is in a different language from the local language, if so, then presenting an option to the user to further limit the query according to results in the local language, and upon confirmation from the user, then processing the user query according to the local language.

Another embodiment of the present invention includes a system for searching a database and returning relevant results. The system includes a system bus for coupling system components, a database coupled to the system bus, a processing unit in communication with the database, software running on the processing unit, wherein the software receives a user query in a first language, queries the database based on the user query to obtain at least one result, processes the at least one result according to a local linguistic context association with the user query, and presents to the user the at least one result including an identifier for each result in which a local linguistic context around a location of the user query is in a second language, an input device in communication with the processor, and an output device in communication with the processor.

In another embodiment, the software determines if the user query is in a different language from the local language, and, if so, then presents an option to the user to further limit the query according to results in the local language, and, upon confirmation from the user, the software processes the user query according to the local language.

Another embodiment of the present invention includes a computer-readable media containing program instructions for searching a database and returning relevant results. The program causes a computer to receive a user query in a first language, query a database based on the user query to obtain at least one result, process the at least one result according to a local linguistic context association with the user query, and present to the user the at least one result including an identifier for each result in which a local linguistic context around a location of the user query is in a second language.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only exemplary embodiments of the invention and are not therefore to be considered to be limiting of its scope, the invention will be described and explained with additional specificity and detail through the use of the accompanying drawings in which:

FIG. 1 illustrates an example system embodiment;
FIG. 2 illustrates a method embodiment;
FIG. 4 is a screen shot of an example query result.

DETAILED DESCRIPTION

Figure 3:
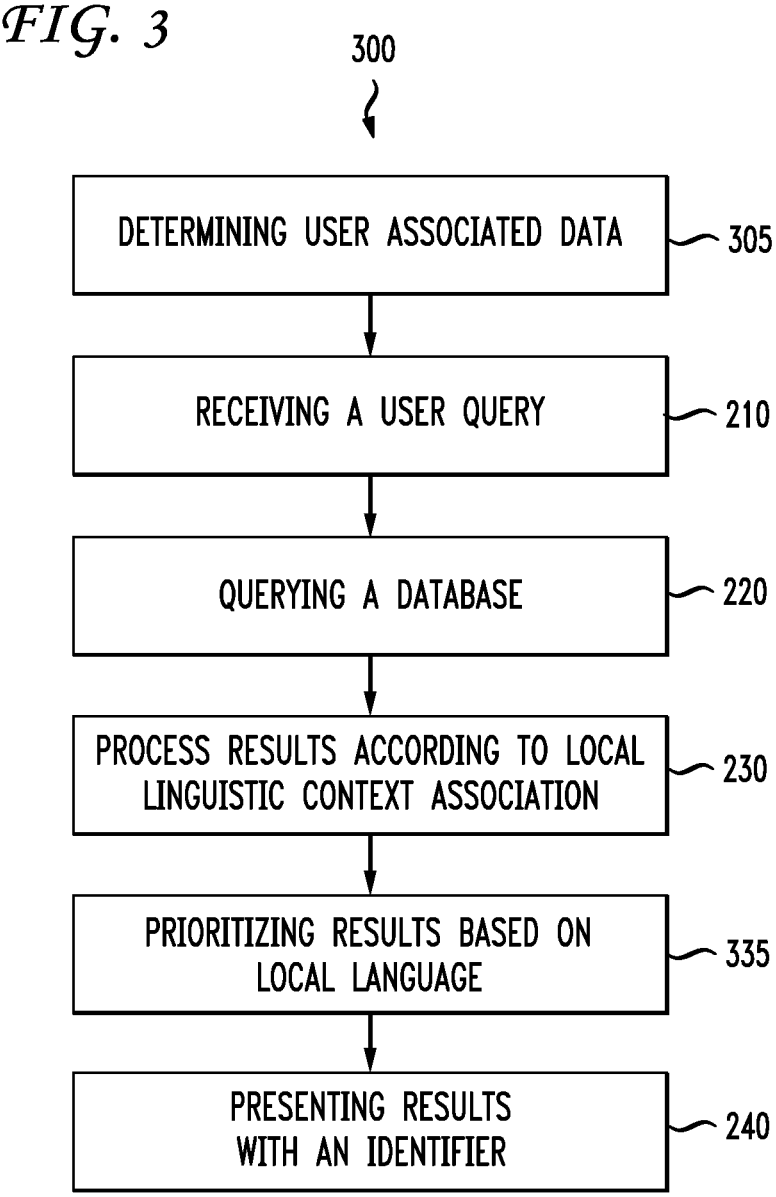
FIG. 3 illustrates another method embodiment.

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

With reference to FIG. 1, an exemplary system includes a general-purpose computing device 100, including a processing unit (CPU) 120 and a system bus 110 that couples various system components including the system memory such as read only memory (ROM) 140 and random access memory (RAM) 150 to the processing unit 120. Other system memory 130 may be available for use as well. It can be appreciated that the invention may operate on a computing device with more than one CPU 120 or on a group or cluster of computing devices networked together to provide greater processing capability. The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices such as a hard disk drive 160, a magnetic disk drive, an optical disk drive, tape drive or the like. The storage device 160 is connected to the system bus 110 by a drive interface. The drives and the associated computer readable media provide nonvolatile storage of computer readable instructions, data structures, program modules and other data for the computing device 100. The basic components are known to those of skill in the art and appropriate variations are contemplated depending on the type of device, such as whether the device is a small, handheld computing device, a desktop computer, or a computer server.

Although the exemplary environment described herein employs the hard disk, it should be appreciated by those skilled in the art that other types of computer readable media which can store data that are accessible by a computer, such as magnetic cassettes, flash memory cards, digital versatile disks, cartridges, random access memories (RAMs), read only memory (ROM), a cable or wireless signal containing a bit stream and the like, may also be used in the exemplary operating environment.

To enable user interaction with the computing device 100, an input device 190 represents any number of input mechanisms, such as a microphone for speech, a touch-sensitive screen for gesture or graphical input, keyboard, mouse, motion input, speech and so forth. The input may be used by the presenter to indicate the beginning of a speech search query. The device output 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on the invention operating on any particular hardware arrangement and therefore the basic features here may easily be substituted for improved hardware or firmware arrangements as they are developed.

For clarity of explanation, the illustrative system embodiment is presented as comprising individual functional blocks (including functional blocks labeled as a "processor"). The functions these blocks represent may be provided through the use of either shared or dedicated hardware, including, but not limited to, hardware capable of executing software. For example the functions of one or more processors presented in FIG. 1 may be provided by a single shared processor or multiple processors. (Use of the term "processor" should not be construed to refer exclusively to hardware capable of executing software.) Illustrative embodiments may comprise microprocessor and/or digital signal processor (DSP) hardware, read-only memory (ROM) for storing software performing the operations discussed below, and random access memory (RAM) for storing results. Very large scale integration (VLSI) hardware embodiments, as well as custom VLSI circuitry in combination with a general purpose DSP circuit, may also be provided.

FIG. 2 is a flow chart of an embodiment of a method 200 of the present invention. Method 200 may include the step of receiving a query from a user 210. The user may input a single term, a string of terms, or any other query parameters in step 210. Method 200 may further include the step of searching one or more databases for the query terms 220. Step 220 may include searching all text within a source, including but not limited to main text, headings, links, metatags, etc.

Method 200 may then compile a list of results that satisfy the query and process the results to determine the language of the result 230. Step 230 may include analyzing the language entire the document, the language of the sentence or sentences within which the query terms are found, the language of the phrases within which the query terms are found, the language of the query terms themselves, the metatages of the result or any other break down of the result. The language may be determined using any method of language identification or a combination of methods. Step 230 may further include allowing the user to further limit the query to results in the local language if there are results in a second language.

Once the results are compiled and analyzed, the user may be presented with the results 240. The results may be presented in such a way that the language of each result is indicated with an identifier. The identifier may be a symbol, a letter, a color, etc. Step 240 may further include a graphical representation, such as, but not limited to, a pie chart, illustrating what percentage of a result is in each language.

FIG. 3 is a flow chart of a method 300 of another embodiment of the present invention. Method 300 may further include the step of determining user associated data 305 before receiving a user query 210, as described above. Step 305 may include determining a user's local language based on, but not limited to, the user's IP address, the user's computer's location, the website's domain name, the user's input, the browser's accepted character set, etc. Local language may also be determined by determining the language of the query terms themselves.

Method 300 may further include the steps of method 200 as discussed above. However, method 300 may also include the additional step of prioritizing results based on the local language 335. Step 335 may include presenting results in the local language first, presenting results of the same language based on which results have the local linguistic context of the local language, etc. Additionally, method 300 may include relating the identifier of step 240 to the data determined in step 305.

In another embodiment of a method of the present invention, there may be a step wherein the words that are in a second language are translated into the local language. This step may be initiated by a prompt from the user or may be automatic. Additionally, words in the languages other than the local language may be highlighted. Words from each language may be highlighted in a single uniform color or all word from languages other than the local language may be highlighted in the same color.

FIG. 4 is a screen shot 400 of an example set of query results. In this example, the query is executed on a database of movie quotations. A user may enter query terms and criteria in query box 410. In this example, as can be seen in query box 410, the query is for the French word "l'amour" and results are sorted by year.

After the query is conducted, a summary of results 420 may be displayed. Below summary of results 420, may be results 430. In this example, results 430 are displayed by movie. For each move, an excerpt of each instance of the query term is displayed. As can be seen in excerpt 440, each excerpt may include the surrounding context which includes text in a second language (English).

In this example, while the query was for a French term, the user was an English speaker. Based on the user's choice of language (which, as describe above, can be determined from the user's IP address, the user's computer's location, the website's domain name, the user's input, the browser's accepted character set, etc.), results 430 may additionally indicate the language of the result if it is not in the users language of choice. In this example, a French flag 450 is used to indicate results that are predominantly in French.

In this manner, FIG. 4 illustrates a benefit of the basic approach of the present invention. A user may be able to view results and quickly determine whether the document that contains the search results which may be in a language such as French, determine whether the document is of the same language as the search query or a different language from the search query. In this regard, a user may be able to easily distinguish which documents are of interest and which are not of interest. In FIG. 4, several documents are tagged with both French flag 450 as well as the basic context of each search term in the same language as the search term, namely, French. If the user desires a document in French, the user can quickly sort and identify documents that are primarily in French. There may be also another distinguishing feature where a document may be primarily in French but have a fair amount of another language such as English. In this regard, there may be further variations such as a size, color or intensity or some other variable visual parameter on the indicator 450 that can aid the user in understanding to what degree the source document matches the language of the search terms.

Also shown are results such as the women, dinner, women and love, and Raising Arizona in which the source documents are in English and the multi-lingual context is presented for each location within in the document of the search term "l'amour".

With regards to user input, it is noted that feature 460 illustrates a sorting option for the user to sort documents by according to the language of the source document. In this regard, the source documents tagged with 450 may be presented first or second depending on further user input and may also be presented in an ascending or descending order based on the percentage or proportionality of the language of the source document being the same or different from a language of the search term.

In another aspect of the invention, there may be some search terms that are exactly the same in two different languages. For a simple example, consider the word "no" which is the same in English and Spanish. In such cases, a dialog may be presented to the user in which the user is requested to identify the language of the search query and/or a desired language of source documents. In this context, if the user inserts a word that is exactly the same in multiple languages, the system may present a user with a prompt which requests "do you seek the word 'no' in either Spanish or English", the user may response and the brief dialog may continue in order to enable the gathering of sufficient information for the user to able to receive what is desired, which may be either a series of returned documents in English that contain the search terms or a series of documents in Spanish which contain the search terms. Accordingly, there are other aspects of the invention which may involve such interaction with the user tailored to receiving information regarding a first language and a second language between search terms and source documents.

Embodiments within the scope of the present invention may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the invention may be practiced in network computing environments with many types of computer system configurations, including personal computers, hand-held devices, multi-processor systems, microprocessor-based or programmable consumer electronics, network PCs, mini-computers, mainframe computers, and the like. Embodiments may also be practiced in distributed computing environments where tasks are performed by local and remote processing devices that are linked (either by hardwired links, wireless links, or by a combination thereof through a communications network. In a distributed computing environment, program modules may be located in both local and remote memory storage devices.

Although the above description may contain specific details, they should not be construed as limiting the claims in any way. Other configurations of the described embodiments of the invention are part of the scope of this invention. Accordingly, the appended claims and their legal equivalents should only define the invention, rather than any specific examples given.

We claim:

1. A method comprising:
  receiving a user query in a first language;
  identifying a local language associated with a current location of a user device; and
  when the first language is distinct from the local language:
    querying a database based on the user query, to yield search results, wherein the search results comprise (1) a first result having a first word in the first language and a second word in the local language and (2) a second result predominantly in the first language;
    prioritizing the search results by first presenting the first result followed by the second result, to yield prioritized search results; and
    presenting the prioritized search results with an indication associated with the second result identifying that the second result is predominantly in the first language.

2. The method of claim 1, wherein the current location is identified based on an internet protocol address of the user device.

3. The method of claim 1, wherein the local geographic linguistic context comprises one of a sentence and a phrase in the local language comprising a translation of the user query into the local language.

4. The method of claim 1, wherein search results comprise first language search results in the first language and local language search results based on the local geographic linguistic context.

5. The method of claim 1, further comprising identifying a primary language of a search result in the search results based on one of a metatag and a language analysis of the search result.

6. The method of claim 5, wherein the indication of amounts further comprises presenting a graphical representation illustrating how much of the document is in the first language and how much is in the local language, the graphical representation comprising a flag.

7. The method of claim 1, further comprising:
  upon determining the first language is distinct from the local language, presenting an option to further limit the user query according to results in the local language; and
  upon receiving a confirmation, processing the user query according to the local language.

8. A system comprising:
  a processor; and
  a computer-readable storage medium having instructions stored which, when executed by the processor, cause the processor to perform operations comprising:
    receiving a user query in a first language;
    identifying a local language associated with a current location of a user device; and
    when the first language is distinct from the local language:
      querying a database based on the user query, to yield search results, wherein the search results comprise (1) a first result having a first word in the first language and a second word in the local language and (2) a second result predominantly in the first language;
      prioritizing the search results by first presenting the first result followed by the second result, to yield prioritized search results; and
      presenting the prioritized search results with an indication associated with the second result identifying that the second result is predominantly in the first language.

9. The system of claim 8, wherein the current location is identified based on an internet protocol address of the user device.

10. The system of claim 8, wherein the local geographic linguistic context comprises one of a sentence and a phrase in the local language comprising a translation of the user query into the local language.

11. The system of claim 8, wherein search results comprise first language search results in the first language and local language search results based on the local geographic linguistic context.

12. The system of claim 8, wherein the computer-readable storage medium has additional instructions stored which result in operations comprising:
  identifying a primary language of a search result in the search results based on one of a metatag and a language analysis of the search.

13. The system of claim 8, wherein the indication of amounts further comprises presenting a graphical representation illustrating how much of the document is in the first language and how much is in the local language, the graphical representation comprising a flag.

14. The system of claim 8, wherein the computer-readable storage medium has additional instructions stored which result in operations comprising:
  upon determining the first language is distinct from the local language, presenting an option to further limit the user query according to results in the local language; and
  upon receiving a confirmation, processing the user query according to the local language.

15. A computer-readable storage device having instructions stored which, when executed by a computing device, cause the computing device to perform operations comprising:
  receiving a user query in a first language;
  identifying a local language associated with a current location of a user device; and
  when the first language is distinct from the local language:
    querying a database based on the user query, to yield search results, wherein the search results comprise (1) a first result having a first word in the first language and a second word in the local language and (2) a second result predominantly in the first language;
    prioritizing the search results by first presenting the first result followed by the second result, to yield prioritized search results; and
    presenting the prioritized search results with an indication associated with the second result identifying that the second result is predominantly in the first language.

16. The computer-readable storage of claim 15, wherein the current location is identified based on an internet protocol address of the user device.

17. The computer-readable storage device of claim 15, wherein the local geographic linguistic context comprises one of a sentence and a phrase in the local language comprising a translation of the user query into the local language.

18. The computer-readable storage device of claim 15, wherein search results comprise first language search results in the first language and local language search results based on the local geographic linguistic context.

19. The computer-readable storage device of claim 15, the computer-readable storage device having additional instructions stored which result in operations comprising identifying a primary language of a search result in the search results based on one of a metatag and a language analysis of the search result.

20. The computer-readable storage device of claim 15, wherein the indication of amounts further comprises presenting a graphical representation illustrating how much of the document is in the first language and how much is in the local language, the graphical representation comprising a flag.

21. The computer-readable storage device of claim 15, wherein the computer-readable storage device having additional instructions stored which result in operations comprising:
   upon determining the first language is distinct from the local language, presenting an option to further limit the user query according to results in the local language; and
   upon receiving a confirmation, processing the user query according to the local language.

* * * * *